United States Patent Office 3,235,452
Patented Feb. 15, 1966

3,235,452
GRANULAR PESTICIDAL COMPOSITIONS AND
METHODS OF PREPARATION
Ralph Miller, Pleasantville, Herbert F. Johanson, Spring Valley, and Harry Falber, Bayside, N.Y., assignors to Geigy Chemical Corporation, town of Greenburgh, N.Y., a corporation of Delaware
No Drawing. Filed Mar. 5, 1962, Ser. No. 177,220
9 Claims. (Cl. 167—42)

This invention relates to novel granular pesticidal compositions as well as to methods for their manufacture. More particularly, this invention pertains to pesticidal granules comprising as constituents a non-absorbent hard carrier, a finely divided, highly absorbent, non-adhesive powder and a potent pesticidal agent.

It is economically feasible to employ complex organic pesticides because they are so potent that pest control can be obtained at low dosage rates. The only method that has been devised to date for accurately applying low dosage rates of potent pesticidal active ingredients consists of diluting them in one way or another and then dispensing the diluted mixture. The usual diluents are water, inexpensive solvents, inert powders, and, relatively recently, granule carriers. The choice of the diluent is determined by a variety of factors such as, the physical and chemical characteristics of the active ingredient, the degree of dilution required to obtain adequate coverage, the peculiarities of the pest to be controlled, the size and nature of the infested area, the equipment to be used in applying the formulated pesticide and similar considerations.

Nearly every pesticide is now available as a granule because of the advantages which granular formulations offer as compared to sprays and dusts. The following are just a few of the reasons granular formulations are now used.

Many pesticidal active ingredients are toxic or irritating to human beings. By incorporating such substances into granular formulations, they are less hazardous to apply than when used as dusts or sprays.

The application of some insecticides in spray or dust form can result in a harmful residual concentration of active ingredient in the harvested crop. Granular insecticide formulations can be applied to some crops, e.g. tomatoes, in such a manner that there is little contact between the fruit and the toxicant and such contact is very brief. As a consequence, the harvested fruit is free from any contaminant.

Certain pests, such as mosquitos, breed in marshy areas or in water surrounded by brush. It is impossible to apply sprays or dust effectively to such areas. Granules can be applied from airplanes or by power applicators which have the ability to project granules at distances in excess of 50 feet in a uniform pattern in a swath of about 40 feet wide. Unlike sprays or dust which are stopped by a brush canopy, the granules fall through the boughs and leaves into the area to which the toxicant must be applied if it is to destroy the insect.

The application of pestcides in spray form requires bringing water to the field in auxiliary tanks and the use of relatively expensive spray equipment for the actual application.

The bulk of the granular compositions hitherto produced commercially consist of a preformed absorbent carrier whose individual particles are smaller than 15 mesh and larger than 50 mesh. Attapulgite clay granules that have been heat-treated to develop their absorptive properties are the usual carriers. Other types that have been used include vermiculite, bentonite, tobacco stems and perlite. See T. L. Wainscott and W. G. Lovely, "Now—Granular Weed Killers," Successful Farming, pp. 46–47 and 102 (November 1959). In these instances the ease of production and quality of the finished pesticidal granule depends upon the absorptive capacity of the carrier material.

However, the absorbent carriers that have been used to date in granular compositions have properties which seriously limit their usefulness.

First, they are so fragile that they can only be handled in tumbling-type blending equipment, such as, a cement mixer. An unsatisfactory product results when the attempt is made to formulate a pesticide granule on an absorbent carrier in ribbon blenders. The need to handle these carriers with the utmost gentleness is shown by K. Krausche, "Granular Pesticides," Agricultural Chemicals, pp. 31–32 and 129 (April 1959).

Application difficulties also result from the fragility of absorbent carriers. Most mechanical applicators subject the material dispensed to a certain amount of attrition. Even a small amount of attrition can cause enough fines to be formed to upset the applicator's calibration. This causes spotty distribution and uneven control.

Another disadvantage is that these absorbent carriers accelerate the rate of deterioration of many pesticidal active ingredients, although they are characterized as being inert—and they are insofar as their behavior toward pests are concerned. In some instances this incompatibility can be kept within acceptable limits by the inclusion of "deactivators" or "stabilizers" in the formulation. In other cases the incompatibility is so marked that acceptable shelf-life cannot be achieved even by the use of stabilizers. See F. M. Fowkes et al., "Clay Catalyzed Decomposition of Insecticides," Journal of Agricultural and Food Chemistry, vol. 8, pp. 203–209 (1960).

Another type of pesticidal granule is described in Canadian Patent 589,926. That patent discloses pesticidal compositions which comprise a relatively dense, non-porous inert core, such as sand, pebble, limestone, glass grits, etc. enclosed in a solid binder film, which consists of a water-soluble or water-sensitive adhesive, such as, sodium silicate, polyvinyl alcohol, starches, etc. This adhesive binder which is used in the form of aqueous solutions in the manufacture of the granule, bonds a solid pesticidal powder to the core. It is important in those granules that the pesticide is distributed therein in the form of a discontinuous, finely divided phase, so that water can get to the binder and release the pesticide from the core.

However, many pesticidal agents are easily affected by water in a deleterious way. Therefore, it is not feasible to prepare granular compositions therewith in accordance with the above Canadian patent. Such pesticidal compounds are released by a process of vaporization or by water. If water is instrumental in their release it is by means of displacement of the active ingredient from the absorbent powder rather than by dissolution of any binder.

It is the principal object of the present invention to produce pesticidal granules containing an active pesticidal ingredient in a relatively high concentration on a strong non-absorbent carrier. A further object of this invention is to prepare such pesticidal granules which are stable and wherein the active ingredient is unaffected by the carrier materials. A still further object of this invention is to make pesticidal granules of sufficient hardness capable of being distributed by power applicators without excessive dust being formed. Still another object is to manufacture pesticidal granules with liquid or liquefiable active ingredients. Other objects and advantages of the invention will be obvious from the description hereinafter.

We have now found that it is possible to make commercially acceptable, improved pesticidal granules which conform to the above objects. Our invention is based on the discovery that such pesticidal compositions can surprisingly and unexpectedly be prepared without the use of a porous carrier material and/or an adhesive binding material, which are characteristic of prior art formulations, by using a non-porous and hard granular carrier material and a non-adhesive, water-insoluble powder instead and by employing blenders with very intense mixing action.

According to the instant invention, these pesticidal compositions are free-flowing, hard and relatively concentrated granules. These granules are dry and substantially dust-free. They comprise, as stated above, as constituents a non-absorbent hard carrier, a highly absorbent, non-adhesive, finely divided powder and a potent pesticidal compound as active agent.

One active ingredient, in accordance with this invention, is an exceedingly potent liquid insecticidal compound, preferably an ester of dialkoxy phosphoric acid of the following general formula

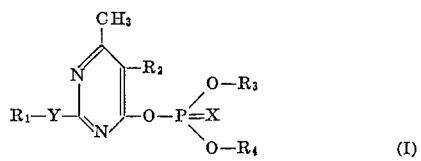

wherein $R_1$ represents alkyl, alkenyl, alkoxyalkyl or alkylmercaptoalkyl radicals, $R_2$ stands for hydrogen, lower alkyl or lower alkenyl radicals, $R_3$ and $R_4$ are lower alkyl radicals, X represents oxygen or sulfur and Y consists of the direct link or sulfur.

These compounds which are disclosed and claimed in U.S. Patent 2,754,243, and particularly the dialkoxy thiophosphates, as for example, O,O-diethyl-O-(2-isopropyl-4-methyl-6-pyrimidyl) thiophosphate (Diazinon), are of great commercial value by virtue of their well-established insecticidal and acaricidal activity and consequent usefulness in pest control.

It is possible—and contemplated—to use also esters of dialkoxy phosphoric acids of the following formula:

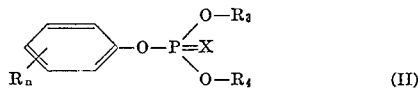

wherein the symbols X, $R_3$ and $R_4$ have the significance ascribed to them hereinabove, R denotes lower alkyl, particularly, methyl and ethyl; halogen, particularly, chlorine and bromine; nitro and methylmercapto, and $n$ is an integer of from 1 to 3. Compounds embraced by this formula are likewise well-known pesticides, as for example, O,O-diethyl-O-p-nitrophenyl thiophosphate (Parathion), O,O-dimethyl-O-p-nitrophenyl thiophosphate, O,O-dimethyl-O-(3-chloro-4-nitrophenyl)thiophosphate (Chlorthion), O,O-dimethyl-O-(2-chloro-4-nitrophenyl)-thiophosphate (Dicapthon), O,O-dimethyl-O-2,4,5-trichlorophenyl thiophosphate (Ronnel), O,O-diethyl-O-p-nitrophenyl phosphate, etc.

It is contemplated that in addition to liquid pesticides also low-melting solid pesticides or other solid pesticides can be used in the manufacture of pesticidal granules in accordance with this invention. When low-melting solid pesticides are employed they are first heated to render them liquid and when other solid pesticides are used they are dissolved in suitable non-aqueous solvents to render them liquid, so that they can be absorbed by the highly absorbent, non-adhesive powder used.

Examples of solid insecticides are esters of dialkoxy phosphoric acid of the following formula:

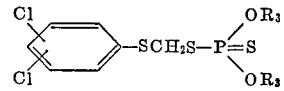

wherein $R_3$ and $R_4$ represent lower alkyl radicals.

Such compounds are disclosed and claimed in U.S. Patent 2,891,984. O,O-dimethyl-S-(dichlorophenylmercaptomethyl)dithiophosphate (methyl phencaptone) has outstanding insecticidal and acaricidal activity.

The pesticidal compositions of this invention contain from about 3% to about 15% by weight, and preferably at least 5% by weight, of the active ingredient chosen.

The carrier material employed as core is relatively concentrated and hard as well as non-porous and inert. Such materials are especially particles of hard nut shells, such as walnut, pecan, brazil, cocoanut; and fruit pits, such as peach, apricot, plum, etc. as well as corncobs, marble chips, granular talc, granular pyrophyllite, etc., with hard nut shell particles, fruit pit particles and corncob particles being preferred and hard nut shell particles, particularly, walnut shell particles, being especially preferred. These granular carriers constitute from about 65% to about 94% by weight, and preferably not more than 90% by weight, of the finished granules and fall substantially within the 15 x 60 mesh (U.S. Sieve Series) range, and more preferably the 20 x 40 mesh range.

The non-adhesive material by means of which the active ingredients bonded to the carrier in a way which is not fully understood, is a finely divided, highly absorbent, water-insoluble powder, such as synthetic calcium or magnesium silicate, hydrated silica, silica aerogel, etc. Synthetic calcium silicate, known as Micro-Cel A (chemical analysis: CaO, 25.3; $SiO_2$, 51.7; $Al_2O_3$, 1.8; $Fe_2O_3$, 0.9; $Na_2O$—$K_2O$, 0.5; ignition loss at 1800° F., 18.0) and synthetic precipitated hydrated silicon dioxide, known as Hi-Sil 233 (chemical analysis: $SiO_2$, 85; CaO, 3; $Fe_2O_3$, 0.3; $Al_2O_3$, 0.3; NaCl, 1.5) are highly suitable materials with the latter being especially preferred. This ingredient constitutes from about 5 to about 15% by weight, and preferably 5 to 10% by weight, of the finished product.

In addition to the constituents described above, it is sometimes advantageous to use a small amount of a stabilizer, such as, precipitated magnesium carbonate, and/or one or more of the following compounds: epoxidized soybean oil (Epoxol 7–4), epoxidized linseed oil (Epoxol 9–5), vinyl cyclohenedioxide (Unox Epoxide 206), propylene oxide, epichlorhydrin, etc., with epoxidized soybean oil being especially preferred. The stabilizer or mixture of stabilizers may be present in the range from about 1 to about 3% by weight and preferably about 2% by weight. However, it is not necessary that such stabilizers be employed, since the carriers of the invention are truly inert.

As stated above, it is particularly surprising that pesticidal granules of such compositions can be made in blenders, such as ribbon blenders, which are equipped with internal agitators or dispersion bars that are normally employed to break up agglomerates or that would be expected to crush and powder particles. These agitators or dispersion bars cause the powder that has absorbed the desired amount of liquid toxicant to adhere to the granular carrier materials by an intense agitation, a pounding or beating action. The beating action achieved in such blenders results from the repeated falling of solid granules within the space traversed by these agitators or dispersion bars which are rapidly rotating. These rapidly moving agitators violently hit the solids with which they come into contact. The impact of the rotating agitators against the granules charged to the blender does not break the particles down, but on the contrary builds them up. In addition to ribbon blenders any other blenders can be employed provided they are furnished with such agitators or similar devices.

The invention may be illustrated in greater detail by the following examples; it is, however, not limited thereto.

*Example 1*

| Component: | Percent by weight |
|---|---|
| Technical Diazinon liquid 95% | 10.8 |
| Micro-Cel A powder | 9.5 |
| Walnut shell particles—20/40 mesh | 79.7 |

The total weight of the batch was 5000 grams.

The solid ingredients were placed in a laboratory-sized, Twin-Shell rotating blender equipped with an internal agitator and means for adding liquid to the tumbling solids, and while the blender was rotating the liquid Diazinon was added to the tumbling solids. The addition of the Diazinon liquid caused some agglomerates to form. The internal agitator was put into operation for a short period to break up the agglomerates and the tumbling and agitation was then stopped to observe the condition of the batch. It was noted that, although the batch was powdery, some of the walnut shell particles seemed to have an adherent coating on them. The tumbling was resumed but the batch stayed powdery. When the batch did not improve, the internal agitator was put into operation once again while the tumbling was continued. At the end of an additional 5 minutes of intensive internal mixing the batch was improved in appearance although still dusty. The tumbling and internal mixing were resumed and periodically the appearance of the batch observed. At the end of about 40 minutes of intensive mixing the batch seemed finished. The batch was subjected to an additional 10 minutes of intensive mixing and then removed from the blender.

This treatment converted the charge to a dry, uniformly granular product. No dust was present. The individual particles showed no tendency to clump together. A 4 oz. glass bottle was half-filled with the granules, stoppered, and slowly rotated. The surface of the glass remained clear showing the absence of dust. The particles readily rolled over each other displaying a constant angle of repose.

The dispensing properties of the product were evaluated in a typical granule applicator consisting of a rounded V shaped hopper with adjustable bottom openings and a vaned rotor attached to a chain driven sprocket so that the rotor was turned at 12 r.p.m. It was found that with each specific outlet opening the applicator put out the granules at a substantially constant rate. Inconsequential amounts of the Micro-Cel powder were rubbed off the walnut shells by the attrition caused by the small clearance between the sides of the hopper and the outermost edge of the rotor.

The particle size distribution was determined of the feed to, and the output from, the applicator. The data obtained are as follows:

PARTICLE SIZE DISTRIBUTION OF 10% DIAZINON SHELL AGGREGATE GRANULES

| U.S. Standard Sieve series Mesh Fraction Designation | Percent by Weight in Mesh Fraction | |
|---|---|---|
| | Feed to Applicator | Output from Applicator |
| +18 | 0.6 | 0.3 |
| −18 +50 | 98.9 | 98.8 |
| −50 | 0.5 | 0.9 |

The above experiment demonstrates that unsatisfactory granules are obtained in the absence of the pounding or beating action that takes place in blenders equipped with agitators.

To confirm the necessity of impact the following test was carried out. A laboratory-sized ribbon blender was charged with the same solids in the same proportion as in the above formulation. With the spirals rotating the liquid was slowly poured into the moving mass. At the end of about 40 minutes of blending, a uniform product of excellent quality was obtained.

*Example 2*

Granules of equally good physical quality containing about 15% Diazinon liquid were made on a walnut shell carrier by following the above procedure but varying the proportions of the constituents in the formulation as follows:

Component: Percent by weight
   Technical Diazinon liquid _____ 16.5
   $MgCO_3$, basic ppt. _____ 1.5
   Micro-Cel A _____ 9.8
   Walnut shell aggregate _____ 72.2

Granules of the same good quality as those made in the laboratory have been obtained on a plant scale.

*Example 3*

A 1000 pound batch was made as follows:

Component: Percent by weight
   Technical Diazinon liquid _____ 11.1
   $MgCO_3$, basic ppt. _____ 1.0
   Micro-Cel A powder _____ 8.7
   Walnut shell particles _____ 79.2

The solid constituents of the formulation are placed in the blender, a 6 foot diameter conical blender equipped with an internal disintegrator consisting of an independently driven, rapidly rotating internal axis on which a pair of serrated toothed wheels are mounted, and tumbled for about 3 minutes with the disintegrator moving at about 2,000 r.p.m. The blender is stopped, reopened and the liquid poured in through the top opening. Tumbling and intensive mixing are resumed for about 45 minutes. Blending and intensive mixing for this interval converts the charge to a uniform, free-flowing granular product.

In some instances it has been found useful to modify the above procedure by initially charging the blender with about 90% of the finely powdered absorbent, blending and intensively mixing with the liquid for about 30 minutes, adding the last 10% of absorbent powder and intensely mixing for an additional 15 minutes.

*Example 4*

Component: Percent by weight
   Technical Diazinon liquid _____ 11.0
   Epoxol 7-4 stabilizer _____ 1.2
   $MgCO_3$, ppt. _____ 1.0
   Hi-Sil powder _____ 9.8
   Walnut shell particles _____ 77.0

A 1000 pound batch was made in a No. 8 ribbon blender. This is a 9-horsepower blender with a 50 cubic foot capacity. The agitator shaft revolves at 40 r.p.m.

The dry materials were initially blended for a few minutes (5 lb. of Hi-Sil powder held out). The Diazinon-Epoxol mixture was added at the top over a fifteen minute period. The revolving ribbon was on continuously. After a total time of twenty minutes the granules were slightly wet and sticky. The extra Hi-Sil was added and the blending continued. After a total time of fifty minutes the product was dry appearing, dust-free and readily flowable.

*Example 5*

Component: Percent by weight
   Technical Diazinon liquid _____ 10.8
   Epoxol 7-4 stabilizer _____ 1.2
   $MgCO_3$, ppt. _____ 1.0
   Hi-Sil powder _____ 9.5
   Corncob grits, No. 20, or pecan shell _____ 77.5

The products were made in a Patterson-Kelly blender, with the procedure being similar to that for the preparation of walnut shell granules. The dry ingredients were added and blended. A small amount of Hi-Sil was held out when using the corncob grits. The liquid phase was added over a ten minute period and the whole batch was blended using the internal intensifier. Periodic observations showed that the granules were taking on the required characteristics. After thirty-five minutes total time, the extra Hi-Sil was added to the corncob batch.

The pecan shell granules were removed after one hour total blending time and were hard, dry appearing, readily flowable and essentially dust-free. The corncob grit granules were removed after a fifty minute total blending time and were hard (97.8), dry appearing, readily flowable and somewhat dusty (5% extra minus fifty material).

*Example 6*

| Component: | Percent by weight |
|---|---|
| Solid methyl phencaptone | 5.6 |
| Solvesso 100 solvent | 1.4 |
| Epoxol 7–4 stabilizer | 0.6 |
| Hi-Sil 233 powder | 5.1 |
| Walnut shell particles | 87.3 |

The blender used is a double-cone Patterson blender. The dry ingredients were initially blended. Meanwhile a combination of the solid insecticide, the the solvent and the stabilizer were heated in a water bath (120°–130° F. mix temperature) to a uniform liquid mix. The hot mix was poured over the dry ingredients and was blended with internal agitation. After a thirty minute time period, a dry appearing, substantially dust-free and readily flowable product was obtained.

*Example 7*

The preferred commercial embodiment of this invention was made as follows:

| Component: | Percent by weight |
|---|---|
| Diazinon liquid (94%) | 10.85 |
| Epoxol 7–4 stabilizer | 1.18 |
| $MgCO_3$, ppt. | .98 |
| Hi-Sil 233 powder | 8.56 |
| Walnut shell particles | 78.43 |

A 1,530 pound batch was conveniently made in an 80 cubic foot Marion blender, along the top of which extends a pipe, to which wide-angle nozzles are connected at one foot intervals.

The solids in the formulation were added to the blender while the blades were revolving. The solids were dry blended for about three minutes after all the solids have been charged. With the blending action continuing, the previously mixed liquids were sprayed through the nozzles onto the moving solids. About four minutes were required to add the liquid.

The blending was continued for an additional thirty minutes. At this time the product was dry appearing, substantially dust-free and readily flowable. Prior to bagging the product, it was rapidly passed over a 12 mesh screen to remove any oversize that may have been formed inadvertently.

What is claimed is:

1. A granular insecticidal composition comprising from about 65 to about 94% by weight of a relatively hard, inert, non-porous, non-absorbent carrier selected from the group consisting of hard nut shell particles, fruit pit particles and corncob particles; from about 5 to about 15% by weight of a finely divided, highly absorbent, water insoluble, non-adhesive powder which envelops said carrier, the powder being selected from the group consisting of synthetic calcium silicate and hydrated silica; and from about 3 to about 15% by weight of an ester of a dialkoxy phosphoric acid as an insecticidal compound absorbed by said powder, said ester being selected from the group consisting of compounds of the formulae

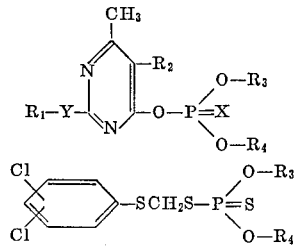

and

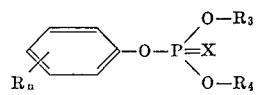

wherein $R$, $R_3$ and $R_4$ represent lower alkyl, $R_1$ is a member of the group consisting of alkyl, alkenyl, alkoxyalkyl and alkylmercaptoalkyl, $R_2$ is chosen from the group consisting of hydrogen, alkyl and lower alkenyl, $X$ is taken from the group consisting of oxygen and sulfur, $Y$ is a member of the group consisting of sulfur and the direct link and $n$ is an integer of from 1 to 3;

said granular composition being made by mixing said carrier, powder and insecticidal compound and simultaneously subjecting the mixture to intense agitation which effects the bonding of said powder having absorbed the insecticidal compound to the carrier without concomitant reduction of the size of the carrier to form granules substantially within the range of about 15 x 60 mesh U.S. sieve series.

2. A granular insecticidal composition comprising from about 65 to about 90% by weight of a relatively hard, inert, non-porous, non-absorbent carrier selected from the group consisting of hard nut shell particles, fruit pit particles and corncob particles; from about 5 to about 10% by weight of a finely divided, highly absorbent, water insoluble, non-adhesive powder which envelops said carrier, the powder being selected from the group consisting of synthetic calcium silicate and hydrated silica; and from about 5 to about 15% by weight of O,O-diethyl-O-(2-isopropyl-4 - methyl - 6 - pyrimidyl)thiophosphate absorbed by said powder; said granular composition being made by mixing said carrier, powder and thiophosphate and simultaneously subjecting the mixture to intense agitation which effects the bonding of said powder having absorbed the thiophosphate to the carrier without concomitant reduction of the size of the carrier to form granules within the range of about 15 x 60 mesh U.S. sieve series.

3. A granular insecticidal composition comprising about 80% by weight of a relatively hard, inert, non-porous, non-absorbent carrier consisting of walnut shell particles; about 10% by weight of finely divided, highly absorbent, water-insoluble, non-adhesive powder which envelops said carrier, the powder being synthetic precipitated hydrated silicon dioxide and about 10% by weight of O,O-diethyl-O-(2-isopropyl-4-methyl - 6 - pyrimidyl) thiophosphate absorbed by said powder; said granular composition being made by mixing said carrier, powder and thiophosphate and simultaneously subjecting the mixture to intense agitation which effects the bonding of said powder having absorbed the thiophosphate compound to the carrier without concomitant reduction of the size of the carrier to form granules within the range of about 15 x 60 mesh U.S. sieve series.

4. A granular insecticidal composition comprising from about 65 to 90% by weight of a relatively hard, inert, non-porous, non-absorbent carrier selected from the group consisting of hard nut shell particles, fruit pit particles and corncob particles; from about 5 to about 10% by weight of a finely divided, highly absorbent, water insoluble, non-adhesive powder which envelops said carrier, the powder being selected from the group consisting of synthetic calcium silicate and hydrated silica; from about 5 to about 15% by weight of O,O-diethyl-O-(2-isopropyl-4-methyl-6 - pyrimidyl)thiophosphate and from about 1 to about 3% by weight of a stabilizer which is incorporated with the thiophosphate in said powder; said granular composition being made by mixing said carrier, powder and thiophosphate and simultaneously subjecting the mixture to intense agitation which effects the bonding of said powder having absorbed the thiophosphate to the carrier without concomitant redutcion of the size of the carrier to form granules within the range of about 15 x 60 mesh U.S. sieve series.

5. A granular insecticidal composition comprising about 80% by weight of a relatively hard, inert, non-porous, non-absorbent carrier consisting of walnut shell particles; about 10% by weight of a finely divided, highly absorbent, water insoluble, non-adhesive powder which envelops said carrier, the powder being synthetic precipitated hydrated silicon dioxide; about 10% by weight of O,O-diethyl-O-(2-isopropyl-4-methyl - 6 - pyrimidyl) thiophosphate as an insecticidal compound absorbed by said powder; and a mixture of about 1.0% by weight of magnesium carbonate and about 1.0% by weight of epoxidized soybean oil as a stabilizer which is incorporated with the insecticidal compound in said powder; said granular composition being made by mixing said carrier; powder and insecticidal compound and simultaneously subjecting the mixture to intense agitation which effects the bonding of said powder having absorbed the insecticidal compound to the carrier without concomitant reduction of the size of the carrier to form granules within the range of about 15 x 60 mesh U.S. sieve series.

6. A process for producing granular insecticidal compositions which comprises mixing from about 65 to about 90% by weight of relatively hard, inert, non-porous, non-absorbent granular carrier particles selected from the group consisting of hard nut shell particles, fruit pit particles and corncob particles and from about 5 to about 10% by weight of a finely divided, highly absorbent, water-insoluble, non-adhesive powder selected from the group consisting of synthetic calcium silicate and hydrated silica; and from about 5 to about 15% by weight of an insecticidal agent in liquid form selected from the group consisting of compounds of the formulae

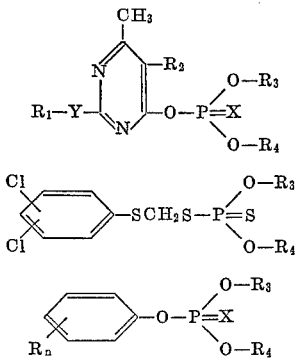

wherein

R, $R_3$ and $R_4$ represent lower alkyl, $R_1$ is a member of the group consisting of alkyl, alkenyl, alkoxyalkyl and alkylmercaptoalkyl, $R_2$ is chosen from the group consisting of hydrogen, alkyl and lower alkenyl, X is taken from the group consisting of oxygen and sulfur, Y is a member of the group consisting of sulfur and the direct link and $n$ is an integer of from 1 to 3;

and simultaneously subjecting the blend to intense agitation which effects the bonding of said powder having absorbed the insecticidal compound to the carrier particles without concomitant reduction of the size of the carrier particles to form granules within the range of about 15 x 60 mesh U.S. sieve series.

7. A process for producing granular insecticidal compositions which comprises mixing from about 65 to about 90% by weight of relatively hard, inert, non-porous, non-absorbent granular carrier particles selected from the group consisting of hard nut shell particles, fruit pit particles and corncob particles and from about 5 to about 10% by weight of a finely divided, highly absorbent, water-insoluble, non-adhesive powder selected from the group consisting of synthetic calcium silicate and hydrated silica and about 2% by weight of a mixture of magnesium carbonate and a compound selected from the group consisting of epoxidized soybean oil, vinyl cyclohexene dioxide, propylene oxide and epichlorhydrin; and from about 5 to about 15% by weight of O,O-diethyl-O-(2-isopropyl-4-methyl-6-pyrimidyl)-thiophosphate and simultaneously subjecting the blend to intense agitation which effects the bonding of said powder having absorbed the thiophosphate to the carrier particles without concomitant reduction of the size of the carrier particles to form granules within the range of about 15 x 60 mesh U.S. sieve series.

8. A granular pesticidal composition comprising from about 65 to about 94% by weight of a relatively hard, inert, non-porous, non-absorbent carrier; from about 5 to about 15% by weight of a finely divided, highly absorbent, water-insoluble, non-adhesive powder which envelops said carrier; and from about 3 to about 15% by weight of a pesticidal compound absorbed by said powder; said granular composition being made by mixing said carrier, powder and pesticidal compound and simultaneously subjecting the mixture to intense agitation which effects the bonding of said powder having absorbed the pesticidal compound to the carrier without concomitant reduction of the size of the carrier to form granules within the range of about 15 x 60 mesh U.S. sieve series.

9. A process for producing granular pesticidal compositions which comprises mixing relatively hard, inert, non-porous, non-absorbent granular carrier particles; a finely divided, highly absorbent, water-insoluble, non-adhesive powder and a pesticidal compound in liquid form and simultaneously subjecting the mixture to intense agitation which effects the bonding of said powder having absorbed the pesticidal compound to the carrier particles without concomitant reduction of the size of the carrier particles to form granules within the range of about 15 x 60 mesh U.S. sieve series.

References Cited by the Examiner
UNITED STATES PATENTS

| | | | |
|---|---|---|---|
| 2,281,786 | 5/1942 | Mohr | 167—42 |
| 2,364,588 | 12/1944 | Morris et al. | 167—42 |
| 2,376,672 | 5/1945 | Dreyling | 167—42 |
| 2,754,243 | 7/1956 | Gysin et al. | 167—33 |
| 2,777,795 | 1/1957 | Veaux | 167—42 |
| 2,821,500 | 1/1958 | Jackson et al. | 167—42 |
| 2,875,121 | 2/1959 | Trademan et al. | 167—42 |
| 2,891,984 | 6/1959 | Gatzi et al. | 167—30 |
| 3,028,305 | 4/1962 | Alvin et al. | 167—42 |
| 3,062,637 | 11/1962 | Marples et al. | 167—42 |
| 3,089,807 | 5/1963 | Trademan et al. | 167—42 |
| 3,097,128 | 7/1963 | Sprinkle et al. | 167—42 |
| 3,137,618 | 6/1964 | Pearce | 167—42 |

JULIAN S. LEVITT, *Primary Examiner.*